United States Patent
Roudeau et al.

(10) Patent No.: US 7,933,704 B2
(45) Date of Patent: Apr. 26, 2011

(54) METHOD AND DEVICE FOR CONTROLLING AN AUTOMATIC TRANSMISSION FOR A MOTOR VEHICLE

(75) Inventors: Frédéric Roudeau, Vitry sur Seine (FR); Thomas Turpin, Orsay (FR)

(73) Assignee: Renault S.A.S., Boulogne Billancourt (FR)

(*) Notice: Subject to any disclaimer, the term of this patent is extended or adjusted under 35 U.S.C. 154(b) by 1119 days.

(21) Appl. No.: 11/596,856

(22) PCT Filed: May 30, 2005

(86) PCT No.: PCT/FR2005/050387
§ 371 (c)(1),
(2), (4) Date: Feb. 2, 2007

(87) PCT Pub. No.: WO2005/119035
PCT Pub. Date: Dec. 15, 2005

(65) Prior Publication Data
US 2007/0244616 A1    Oct. 18, 2007

(30) Foreign Application Priority Data
May 28, 2004    (FR) ...................................... 04 05803

(51) Int. Cl.
*G06F 7/00*    (2006.01)
(52) U.S. Cl. .............................. 701/54; 701/52; 477/111
(58) Field of Classification Search ...................... 701/52
See application file for complete search history.

(56) References Cited

U.S. PATENT DOCUMENTS

| | | | | | |
|---|---|---|---|---|---|
| 5,882,277 | A | * | 3/1999 | Iizuka | 477/125 |
| 6,014,603 | A | * | 1/2000 | Le Van | 701/52 |
| 6,154,701 | A | * | 11/2000 | Loffler et al. | 701/54 |
| 6,442,466 | B1 | * | 8/2002 | Akanuma et al. | 701/51 |
| 6,543,414 | B2 | * | 4/2003 | O'Neil et al. | 123/350 |
| 6,577,938 | B1 | * | 6/2003 | Bellinger et al. | 701/52 |
| 6,671,602 | B1 | * | 12/2003 | Speicher et al. | 701/52 |
| 7,001,307 | B2 | * | 2/2006 | Matsunaga et al. | 477/118 |
| 7,337,051 | B2 | * | 2/2008 | Ota et al. | 701/51 |
| 7,460,943 | B2 | * | 12/2008 | Yamamoto et al. | 701/52 |
| 7,509,193 | B2 | * | 3/2009 | Kustosch | 701/22 |
| 2002/0082759 | A1 | * | 6/2002 | Katakura et al. | 701/54 |
| 2003/0047164 | A1 | | 3/2003 | Jaye | |

FOREIGN PATENT DOCUMENTS

| | | |
|---|---|---|
| DE | 196 25 936 | 1/1998 |
| DE | 199 62 963 | 6/2001 |
| EP | 0 676 566 | 10/1995 |
| FR | 2 827 339 | 1/2003 |

* cited by examiner

*Primary Examiner* — Khoi Tran
*Assistant Examiner* — Brian J Broadhead
(74) *Attorney, Agent, or Firm* — Oblon, Spivak, McClelland, Maier & Neustadt, L.L.P.

(57) ABSTRACT

An automatic transmission of a power train for a motor vehicle capable of producing a set operating speed and a set power train control to attain an engine speed, according to a torque applied to wheels that is adapted to wishes of the driver. The device includes: an input unit that furnishes input data; a control unit having at least two modules according to two distinct driving modes, an automatic mode and a manual mode with pulse control; a processing module for processing signals furnished by a motor vehicle speed control; a selection module that receives signals from the processing module and from the motor vehicle speed control and capable of furnishing a selection signal (mode).

6 Claims, 5 Drawing Sheets

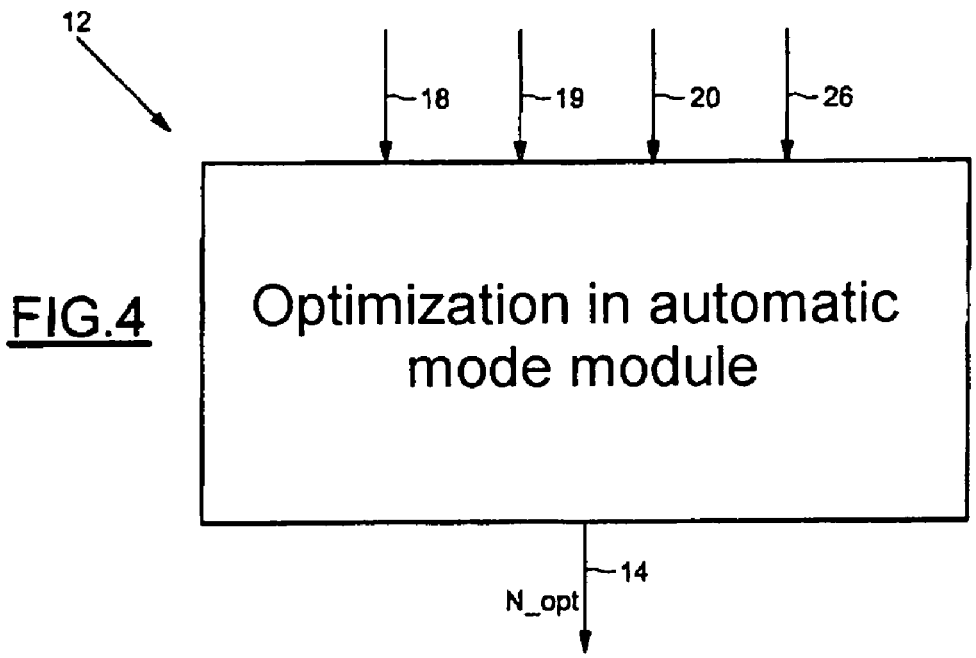
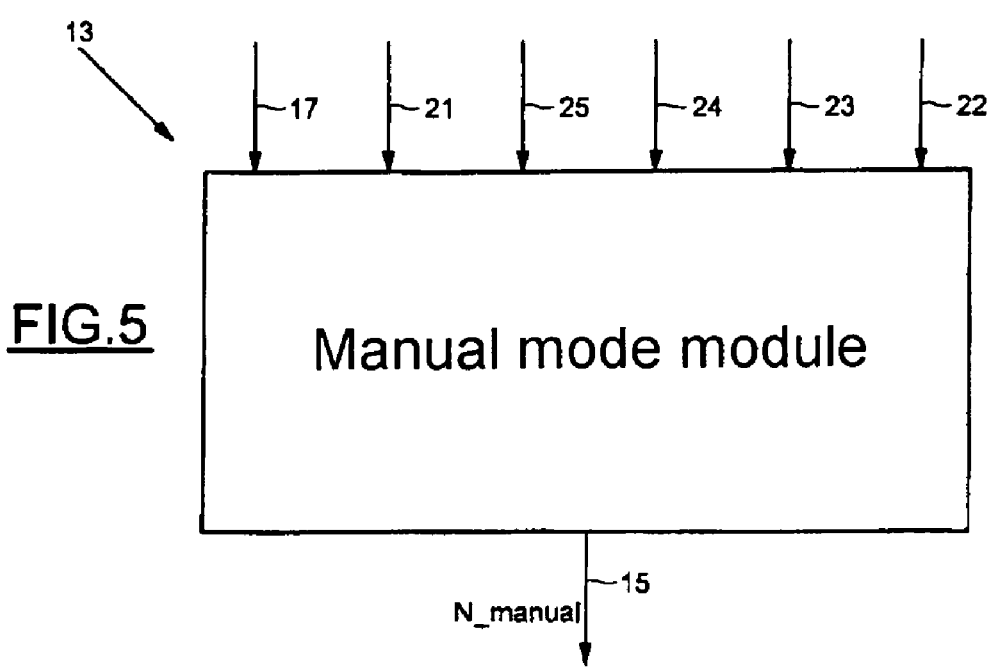

METHOD AND DEVICE FOR CONTROLLING AN AUTOMATIC TRANSMISSION FOR A MOTOR VEHICLE

BACKGROUND

The present invention relates to the control of the operating mode of a power train equipped with an automatic transmission for a motor vehicle.

Automatic transmissions mostly concern pulse controlled gearboxes called BCI (from the French "Boîtes à Commande Impulsionnelle).

A transmission conventionally comprises a control unit receiving one or more input parameters interpreting, among other things, the driver's will. Then, as a function of the value of these parameters, this control unit provides a control instruction for the purpose of an application to the wheels of the motor vehicle.

Also, there has already been described in the document FR-A-2827339, in the name of the applicant, a device for controlling the operating point of a power train intended for a motor vehicle. This device has in particular a module for interpreting the driver's will called IVC (from the French "Interprètation de la Volontè du Conducteur"); said module generates torque instructions intended for the wheels of the motor vehicle, which are then converted into operating speed and control instructions for the power train by a unit for optimizing the operating point called an OPF (from the French "Optimisation du Point de Fonctionnement") module. This torque instruction is determined as a function of the driver's will, the characteristics of the vehicle and of its environment.

However, in a motor vehicle comprising an automatic transmission, the driver can have the choice between two different driving modes: automatic mode and manual mode with pulse control.

In the case of pulse control, the driver can change the gear ratios by moving the control lever of the motor vehicle in order to actuate the controls (+) and (−), generating positive or negative pulses respectively.

The module for optimization of the operating point OPF described in the document FR-A-2827339 does not take into account the manual operating mode, but deals only with the case of the automatic mode.

BRIEF SUMMARY

The purpose of the present invention is to overcome this shortcoming in order to be able to adapt the operating mode control device to the different driving modes which include the automatic mode and the manual mode with pulse control. Another purpose of the invention is to allow the change from one driving mode to the other.

For this purpose, the invention proposes a method for controlling an automatic transmission of a power train for a motor vehicle. The method comprises a step of providing an operating speed and control instruction for the power train in order to attain the set engine speed. The instruction is generated as a function of a torque applied to the wheels adapted to the driver's will and of input data representative of the characteristics of the motor vehicle, the driver's will and the environment of the motor vehicle. The instruction is adapted according to one driving mode selected from at least two distinct driving modes which include an automatic mode and a manual mode with pulse control.

This second module, adapted to the manual driving mode with pulse control, makes it possible to generate the operating speed and control instruction of the power train, adapted to a second driving mode other than the automatic mode.

Preferably, the manual mode with pulse control is selected according to the value of an instruction signal from a gear control means of the motor vehicle after processing said instruction signal.

The generation of an operating speed and control instruction for a power train in the case of the manual mode with pulse control can consist in:
  determining the gear ratio instruction in manual mode with pulse control as a function of a first list of predetermined input parameters,
  converting said gear ratio instruction into an operating and control instruction for the power train according to a second list of predetermined input parameters.

In one embodiment, the first list of input parameters for determining a gear ratio instruction in manual mode with pulse control comprises, for example: the pushing down of the accelerator pedal of the motor vehicle and the position of the gear control means of the motor vehicle.

In one embodiment, the operating speed and control instruction of the power train in manual mode with pulse control is saturated by minimum and maximum engine speed instructions.

Preferably, the operating speed and control instruction of the power train in manual mode with pulse control is limited to values calibrated by the use of a smoothing filter.

Another purpose of the invention is a control device for an automatic transmission of a power train for a motor vehicle, capable of generating an operating speed and control instruction for a power train in order to attain the set engine speed, as a function of a torque applied to the wheels adapted to the driver's will. The device comprises, for example:
  an input unit providing input data representative of the driver's will and of the environment of the motor vehicle,
  a control unit comprising at least two modules respectively adapted to two distinct driving modes, an automatic mode and a manual mode with pulse control, each of the modules being capable of generating an operating speed and control instruction for the power train in order to attain the set engine speed, taking account of the input data supplied by the input unit,
  a module for processing the signals supplied by the gear control means of the motor vehicle,
  a selection module receiving signals coming from said module for processing the signals from the gear control means of the motor vehicle and being capable of providing a signal for selecting a driving mode module as a function of these signals.

The module corresponding to driving in manual mode with pulse control advantageously comprises:
  a unit for determining a manual gear ratio with pulse control instruction,
  a unit for converting said manual gear ratio with pulse control instruction into an operating speed and control instruction for the power train.

BRIEF DESCRIPTION OF THE DRAWINGS

Other advantages and features of the invention will become apparent on examining the detailed description of an embodiment of the invention, which is in no way limiting, and the appended drawings in which:

FIG. 4 is a diagrammatic illustration in more detail of a part of the control unit shown in FIG. 1, FIG. 5 is a diagrammatic illustration in more detail of another part of the control unit shown in FIG. 1.

DETAILED DESCRIPTION

Figure 1:
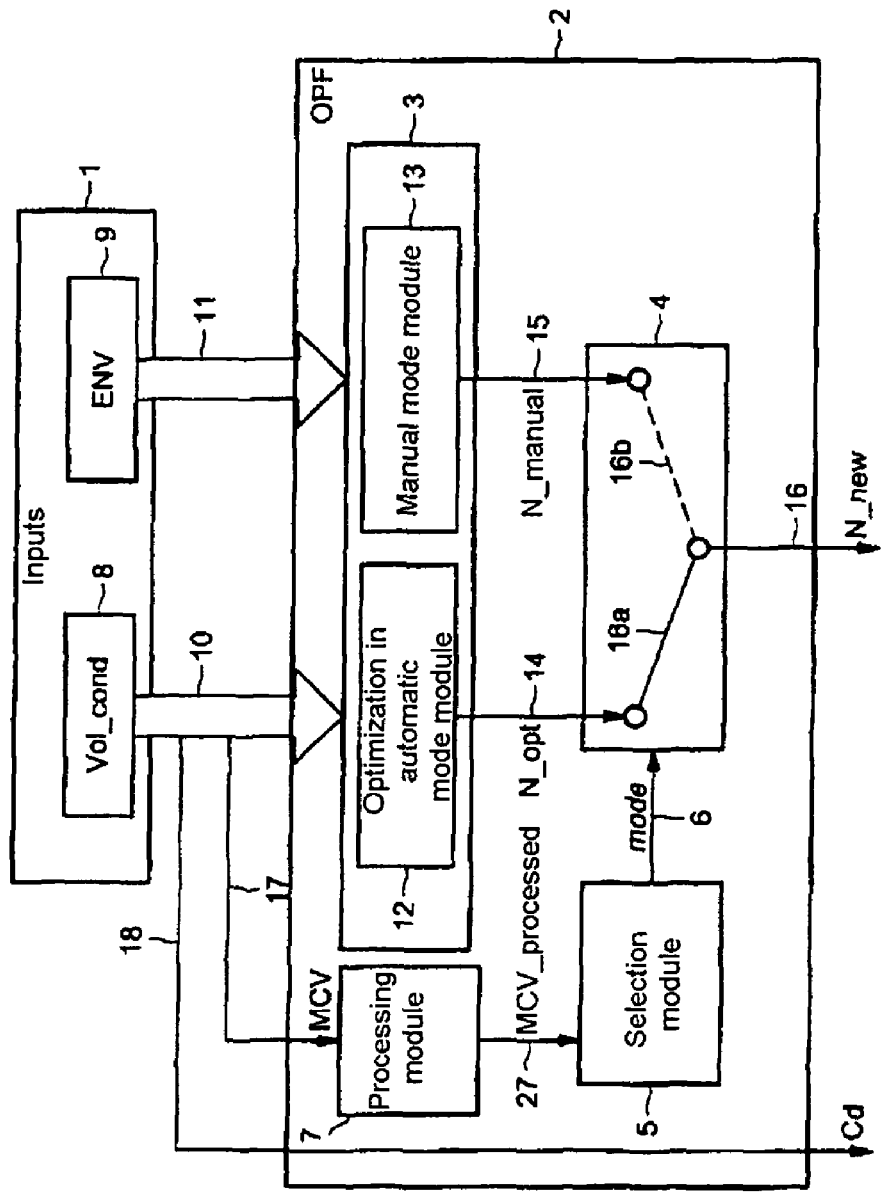
FIG. 1 is a block diagram of an example of embodiment of the device which makes it possible to select a manual or automatic mode according to the invention.

In FIG. 1, an example of an embodiment of the device according to the invention has been shown in a diagrammatic manner.

This device can be included in a control unit for an automatic transmission of a motor vehicle, which is not shown in FIG. 1.

As shown in FIG. 1, the control device comprises an input unit 1 transmitting input data to an OPF unit 2 for optimization of the operating point. The input unit 1 provides different types of input data which will be described in detail below.

The OPF block 2 in particular comprises a control unit 3 which provides various operating speed and control instructions for the power train, according to the driving mode used by the driver. The control unit 3 provides these instructions to the input terminals of a selector 4, which is also contained in the OPF block 2.

A selection module 5, contained in the OPF block 2, sends a "mode" selection signal of an instruction to the selector 4, by the intermediary of a connection 6. The "mode" selection signal is determined according to a signal coming from a processing module 7, also contained in the OPF block 2. The processing module 7 receives a signal from the input unit 1 through a connection 17 connecting the input unit 1 to the processing module 7. This signal passing through the connection 17 interprets an instruction from a gear control means MCV of the motor vehicle. The MCV means of a motor vehicle can for example be a gear lever or paddles located at steering wheel level in the motor vehicle. The processing module 7 then generates a signal MCV_processed transmitted by the intermediary of a connection 27 to the selection module 5 in order that the latter may determine the "mode" selection signal.

The input unit 1 comprises two modules 8 and 9 which are capable of generating a data signal from signals coming from sensors that are not shown and that are integrated in the motor vehicle.

These two modules 8 and 9 communicate with the control unit 3 of the OPF module 2 and provide input data by the intermediary of two separate connections, 10 and 11 respectively, to this unit 3. The control unit 3 comprises two modules associated with two driving modes, module 12 for the automatic mode and module 13 for the manual mode. Each of these two modules are capable of providing to respective inputs of the selector 4 an optimized instruction N_opt for the operating speed and control of the power train in automatic mode on the one hand and N_manual for manual mode with pulse control on the other hand. At its output, the selector 4 provides an instruction for the operating speed and control of the heat engine of the power train N_new, in order to attain the set engine speed. This instruction N_new is transmitted by a connection 16.

Furthermore, the input unit 1 provides, directly on the output of the OPF block 2 for the optimization of the operating point, the dynamic component of the torque instruction Cd through a connection 18.

Figure 2:
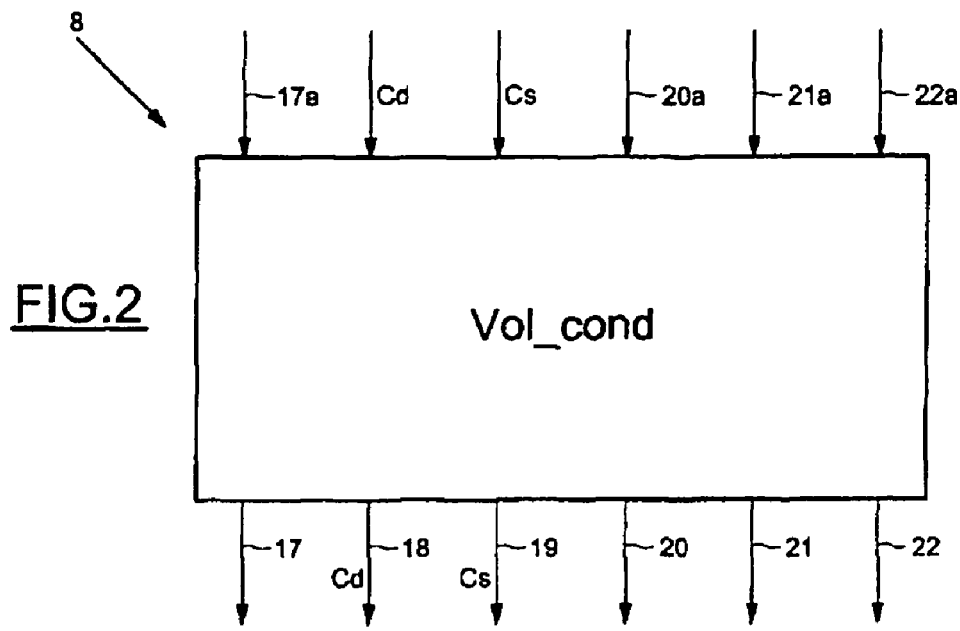
FIG. 2 is a diagrammatic illustration in more detail of a part of the input unit shown in FIG. 1.

More precisely, the first module 8 of the input unit 1 is capable of generating input parameters representative of the driver's wishes Vol_Cond. Referring to FIG. 2 which describes the data generated by the module 8, it is observed that it comprises various inputs to which various outputs correspond. Among these outputs are a signal passing through the connection 17 and corresponding to the MCV means of the vehicle, a signal passing through the connection 18, corresponding to the component Cd, and a signal passing through the connection 19 and corresponding to the static component of the torque Cs. These two components, dynamic and static, come from a module interpreting the driver's will, for example the module IVC, described in the document FR-A-2827339 and not shown in the figure. The module IVC provides, among other things, the dynamic and static components of a torque instruction intended for the wheels of the motor vehicle. This torque instruction is evaluated according to various parameters representative of the characteristics of the motor vehicle, of the driver's will and of the environment of the motor vehicle, these parameters being those of the IVC module.

Another example of parameters provided by the module 8 can be a signal 20 corresponding to the limitations of engine speed variation 20a. The limitation of engine speed variation defines the maximum variation of engine speed over a specified time interval. Furthermore, the limitation of engine speed variation comprises two components, not shown in the figure:
- a limitation of engine speed variation signal component to limit the engine speed variations in the direction of reduction,
- a limitation of engine speed variation signal component to limit the engine speed variations in the direction of increase.

Other examples of parameters provided by the module 8 can be a signal passing through the connection 21 corresponding to the position of the accelerator pedal 21a or a signal passing through the connection 22 corresponding to the sporting nature of the driver 22a.

Figure 3:
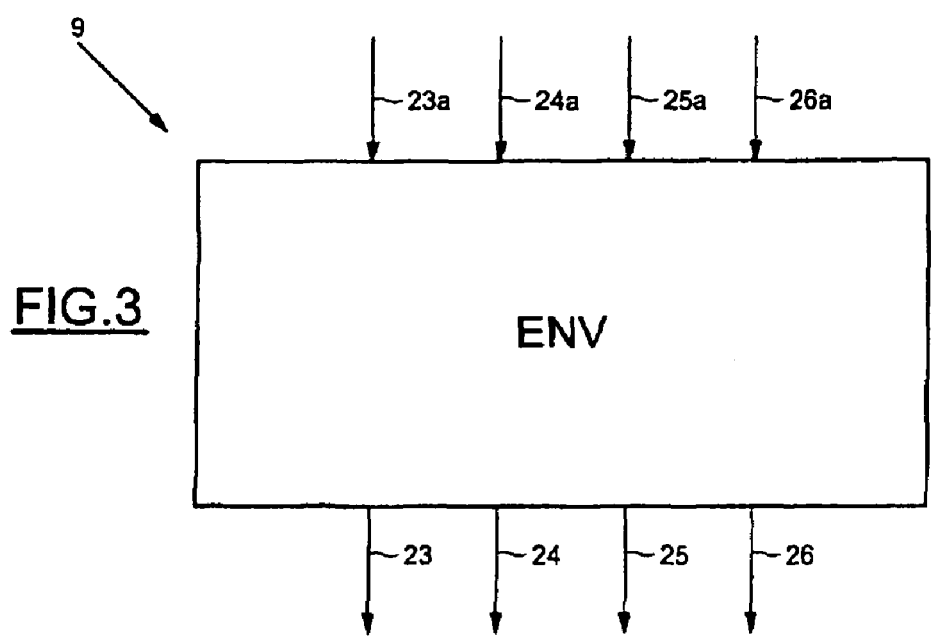
FIG. 3 is a diagrammatic illustration in more detail of another part of the input unit shown in FIG. 1.

Moreover, the second module 9 is capable of generating input parameters representative of the environment of the motor vehicle. The latter make it possible to take account of the state of the motor vehicle and of its situation in the environment. Referring to FIG. 3 which describes more precisely the data generated by the module 9, it is observed that it comprises various inputs to which various outputs correspond. Among these outputs are a signal passing through the connection 23 corresponding to the speed of the motor vehicle 23a, a signal passing through the connection 24 corresponding to the upper limit 24a of the engine speed, a signal passing through the connection 25 corresponding to the lower limit 25a of the engine speed and a signal passing through the connection 26 corresponding to the engine speed of the preceding cycle 26a.

The values of the parameters and of the state of the variables of these input data are stored in a memory common to each element of the device and not shown.

According to the values of the input parameters, a first mode chosen by the selection module 5 can be the optimization mode in automatic mode. The process of generating the instruction N_opt can then be that described in the document FR-A-2827339. This process is carried out according to the data transmitted through the connection 10 which are described in more detail in FIG. 4. These data can be a signal passing through the connection 18 corresponding to the component Cd, a signal passing through the connection 19 corresponding to the component Cs, a signal passing through the connection 20 corresponding to the engine speed variation limitations or again a signal passing through the connection 26 corresponding to the set engine speed of the preceding cycle. In this example, where the optimization mode in automatic mode is chosen by the selection module 5, an instruction N_opt is transmitted to a first input terminal of the selector 4 through the connection 14. The selector 4 selects its first input terminal by establishing a connection 16a with its output terminal. The selector 4 can then supply an instruction N_new. In this case, the instruction N_new corresponds to the instruction N_opt.

Depending on the values of the input parameters, a second mode chosen by the selection module 5 can be the manual mode with pulse control. This process is carried out according to the data transmitted though the connection 11 which are described in detail in FIG. 5. These data can be a signal passing through the connection 17 corresponding to the gear control means of the motor vehicle, a signal passing though the connection 21 corresponding to the position of the accelerator pedal, a signal passing though the connection 22 corresponding to the sporting nature of the driver, a signal passing through the connection 23 corresponding to the speed of the motor vehicle or again signals passing through the connections 24 and 25 respectively corresponding to the upper and lower engine speed limitations. In this example where the manual mode is chosen by the selection module 5, an instruction N_manual is transmitted to a second input terminal of the selector 4 through the connection 15. The selector 4 establishes a connection 16b between its input terminal and its output terminal. The selector 4 can then supply an instruction N_new. The instruction N_new therefore corresponds to the instruction N_manual.

Figure 6:
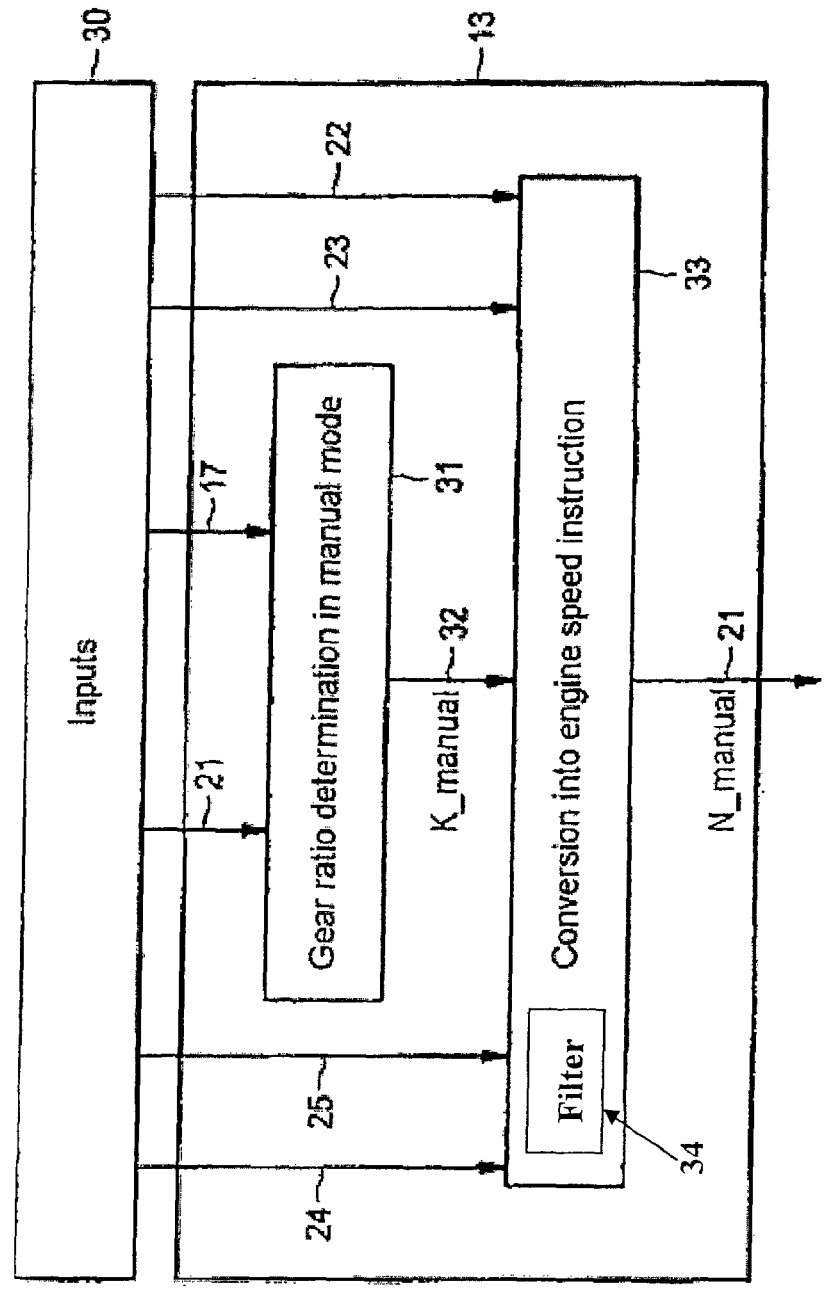
FIG. 6 is a diagrammatic illustration in more detail of an example of a manual mode module shown in FIG. 1.

FIG. 6 shows an embodiment of the manual mode with pulse control module 13.

According to this embodiment, the module 13 also comprises an input unit 30 for the manual mode. The input unit 30 transmits the input data shown in FIG. 5, that is to say the signal passing though the connection 17 corresponding to the gear control means of the motor vehicle, the signal passing through the connection 21 corresponding to the position of the accelerator pedal, the signal passing through the connection 22 corresponding to the sporting nature of the driver, the signal passing through the connection 23 corresponding to the speed of the motor vehicle and the signals passing through the connections 24 and 25 corresponding to the upper and lower engine speed limitations. These data are transmitted to the manual mode with pulse control module 13. The latter comprises two separate units which are a first module 31 for determination of the gear ratio in manual mode and a second module 33 for conversion into engine speed instruction. The first module 31 receives on its input a signal passing through the connection 21 corresponding to the position of the accelerator pedal and a signal passing through the connection 17 corresponding to the MCV means of the motor vehicle. The module then generates the gear ratio K_manual which it transmits through a connection 32 to the second module 33 for converting into engine speed instruction. This second module receives on its input, in addition to the gear ratio instruction K_manual, a signal passing through the connection 22 corresponding to the sporting nature of the driver, a signal passing through the connection 23 corresponding to the speed of the motor vehicle, signals passing through the connections 24 and 25 corresponding to the upper and lower engine speed limitations or again a signal passing through the connection 23 corresponding to the speed of the motor vehicle. The second module 33 generates an instruction N_manual which it transmits to the selector 4 through the connection 15.

The operating mode of the manual mode module with pulse control is as follows.

A first step consists in determining a gear ratio instruction K_manual taking account of the (+) and (−) pulses generated by the MCV means of the motor vehicle. It is possible to calculate this gear ratio instruction K_manual taking account of the position of the acceleration pedal in the case of management of an automatic downshifting function known as "kick-down". This "kick-down" function results in the downshifting of the gearbox in the case in which the accelerator pedal passes through a predetermined hard point. Moreover, this first module 31 integrates speed limitation values such as under-speed and over-speed, limitations specific to the transmission or again limitations related to operational safety.

A second step consists in transforming the gear ratio in manual mode with pulse control K_manual into an instruction N_manual. This transformation is carried out by the second module which multiplies the speed of the vehicle by the ratio associated with the gear ratio in manual mode K_manual supplied by the first module 31. This module is determined from mapped tables. Moreover the instruction N_manual supplied by the second module 33 is limited by two instructions, upper and lower, which represent the acceptable limits of the heat engine. Moreover, in order not to generate sudden variations of the engine speed when the driver changes gear ratio, the variation of the instruction N_manual is limited to values calibrated by the use of a smoothing filter 34 integrated in the second module 33. These values can for example depend on the gear ratio K_manual supplied by the first module 31, the sporting nature of the driver or the latter's wishes.

Figure 7:
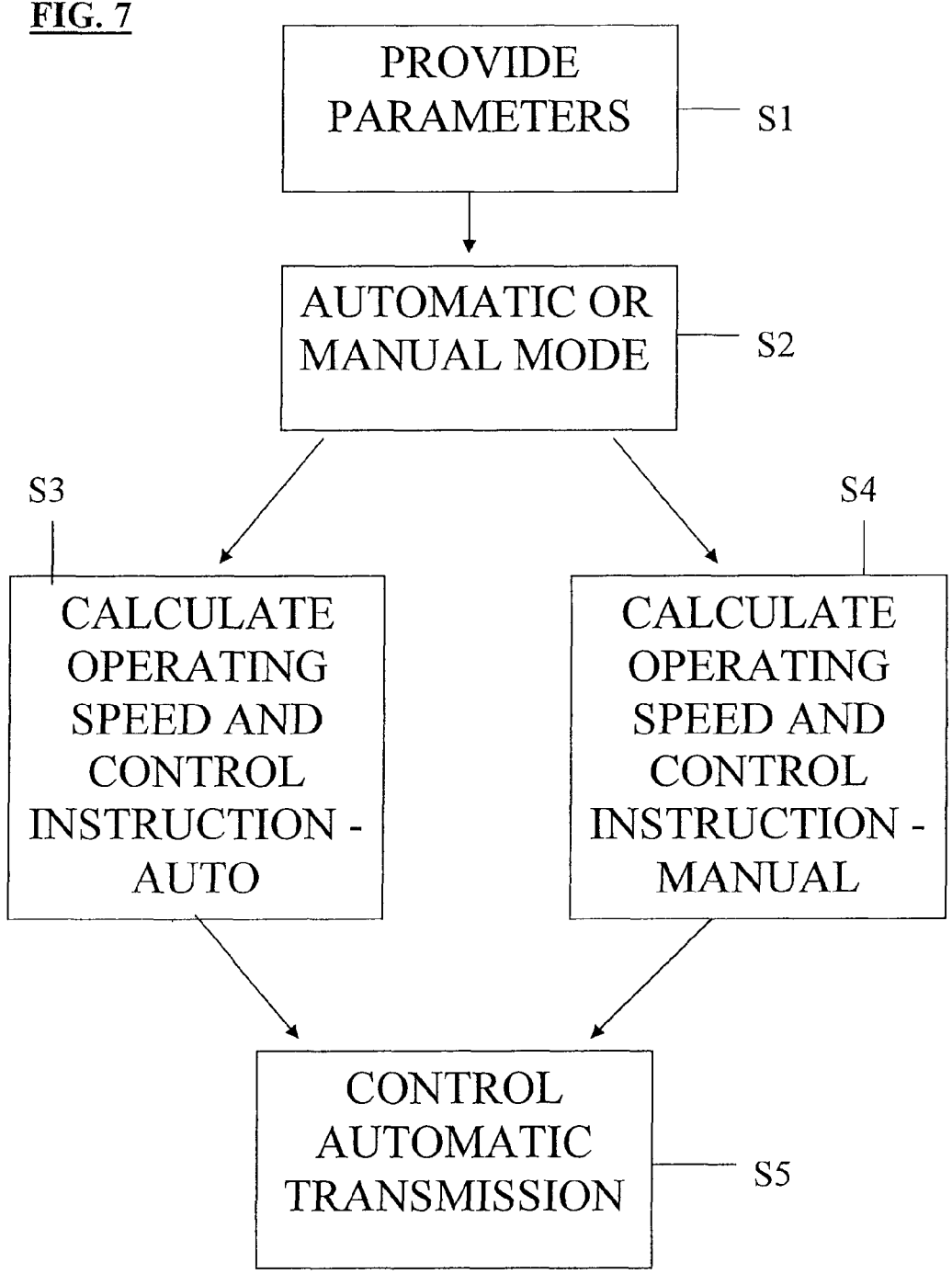
FIG. 7 is a flow diagram of an exemplary embodiment of a method for controlling an automatic transmission of a power train for a motor vehicle.

FIG. 7 shows a flow diagram of an exemplary embodiment of a method for controlling an automatic transmission of a power train for a motor vehicle. In step S1, input data representative of characteristics of the motor vehicle, a driver's will, and an environment of the motor vehicle are provided, as described above with respect to FIGS. 2 and 3. In step S2, the selection module 5 determines whether the automatic transmission is in an automatic mode or a manual mode with pulse control.

If the selection module 5 determines that the automatic transmission is in the automatic mode in step S2, the method proceeds to step S3 and the optimization in automatic mode module 12 calculates the operating speed and control instruction for the power train based on predetermined parameters associated with the automatic mode, as described above with respect to FIG. 4. The calculated operating speed and control instruction for the power train is then applied to the automatic transmission in step S5 to obtain a set engine speed.

If the selection module 5 determines that the automatic transmission is in the manual mode with pulse control in step S2, the method proceeds to step S4 and the manual mode module 13 calculates the operating speed and control instruction for the power train based on predetermined parameters associated with the manual mode with pulse control, as described above with respect to FIG. 5. The calculated operating speed and control instruction for the power train is then applied to the automatic transmission in step S5 to obtain a set engine speed.

The invention claimed is:
1. A method for controlling an automatic transmission of a power train for a motor vehicle, comprising:

providing input data representative of characteristics of the motor vehicle, a driver's will, and an environment of the motor vehicle;

determining whether the automatic transmission is in an automatic mode or a manual mode with pulse control;

generating an operating speed and control instruction for the power train from predetermined parameters of the input data based on one driving mode selected from at least two distinct driving modes that include the automatic mode and the manual mode with pulse control, and the predetermined parameters are selected according to whether the automatic transmission is in the automatic mode or the manual mode with pulse control; and controlling the automatic transmission according to the operating speed and control instruction to obtain a set engine speed, wherein, when the automatic transmission is in the manual mode with pulse control, the generating the operating speed and control instruction for the power train comprises:

determining a gear ratio instruction in the manual mode with pulse control as a function of a first list of predetermined input parameters, and converting the gear ratio instruction into the operating speed and control instruction of the power train according to at least the gear ratio instruction in manual mode with pulse control, a value of a speed of the motor vehicle and activity of the driver, the operating speed and control instruction for the power train in the manual mode with pulse control being limited to values calibrated by a smoothing filter.

2. The control method as claimed in claim 1, wherein the manual mode with pulse control is selected as a function of a value of an instruction signal from a gear control of the motor vehicle after a processing of the instruction signal.

3. The control method as claimed in claim 1, wherein the first list of input parameters for determining the gear ratio instruction in the manual mode with pulse control includes: pushing down of an accelerator pedal of the motor vehicle and a position of a gear control of the motor vehicle.

4. The control method as claimed in claim 1, wherein the operating speed and control instruction of the power train in the manual mode with pulse control is saturated by minimum and maximum engine speed instructions.

5. The control method as claimed in claim 1, wherein the predetermined parameters selected when the automatic transmission is in the automatic mode include a dynamic component of a torque, a static component of the torque, engine speed variation limitations, and a set engine speed of a preceding cycle.

6. A control device for an automatic transmission of a power train for a motor vehicle, configured to generate an operating speed and control instruction for the power train to attain a set engine speed, as a function of a torque applied to wheels of the motor vehicle and adapted to a driver's will, comprising:

an input unit providing input data representative of the driver's will and of an environment of the motor vehicle;

a control unit including at least two driving mode modules respectively configured to two distinct driving modes, an automatic mode and a manual mode with pulse control, each of the modules being configured to generate the operating speed and control instruction for the power train to attain the set engine speed, taking account of the input data supplied by the input unit;

a module for processing signals supplied by a gear control of the motor vehicle; and a selection module receiving signals coming from the module for processing the signals from the gear control of the motor vehicle and configured to provide a signal for selecting one of the driving mode module as a function of these signals;

wherein the module corresponding to driving in the manual mode with pulse control includes:

a unit for determining a manual gear ratio with pulse control instruction, and a unit for converting the manual gear ratio with pulse control instruction into the operating speed and control instruction for the power train according to at least the manual gear ratio with pulse control instruction, a value of a speed of the motor vehicle and activity of the driver, the converting unit including a smoothing unit configured to limit the operating speed and control instruction of the power train to calibrated values.

* * * * *